(12) United States Patent
Hosogoe et al.

(10) Patent No.: US 6,866,192 B2
(45) Date of Patent: Mar. 15, 2005

(54) IC CARD TERMINAL

(75) Inventors: Takashi Hosogoe, Kawasaki (JP); Yoshii Hyodo, Chiyoda-ku (JP); Yasumasa Yamate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/330,277

(22) Filed: Dec. 30, 2002

(65) Prior Publication Data

US 2003/0136829 A1 Jul. 24, 2003

Related U.S. Application Data

(63) Continuation of application No. PCT/JP00/04579, filed on Jul. 7, 2000.

(51) Int. Cl.[7] .................................................. G06K 5/00
(52) U.S. Cl. ....................................... 235/380; 235/492
(58) Field of Search ................................. 235/380, 375, 235/379, 492; 714/47; 340/462.35

(56) References Cited

U.S. PATENT DOCUMENTS

| | | | | |
|---|---|---|---|---|
| 5,679,945 A | * | 10/1997 | Renner et al. | 235/492 |
| 5,815,658 A | | 9/1998 | Kuriyama | |
| 5,901,303 A | * | 5/1999 | Chew | 711/115 |
| 5,917,168 A | * | 6/1999 | Nakamura et al. | 235/379 |
| 5,923,884 A | * | 7/1999 | Peyret et al. | 717/167 |
| 6,296,191 B1 | * | 10/2001 | Hamann et al. | 235/492 |
| 6,547,150 B1 | * | 4/2003 | Deo et al. | 235/492 |

FOREIGN PATENT DOCUMENTS

| | | |
|---|---|---|
| JP | 61-136168 | 6/1986 |
| JP | 63-65591 | 6/1988 |
| JP | 8-202662 | 8/1996 |
| JP | 9-205467 | 8/1997 |
| JP | 11-31199 | 2/1999 |
| JP | 11-353425 | 12/1999 |
| JP | 2000-163493 | 6/2000 |

* cited by examiner

*Primary Examiner*—Diane I. Lee
(74) *Attorney, Agent, or Firm*—Armstrong, Kratz, Quintos Hanson & Brooks, LLP

(57) ABSTRACT

A communication control function for prohibiting communication with card programs due to other terminal applications while a certain terminal application is communicating with its corresponding card program is assigned by the present invention to the IFD driver, which controls communication with an IC card, in an IC card terminal. This enables an IC card terminal to process commands from a plurality of terminal applications without causing an error to occur.

2 Claims, 6 Drawing Sheets

IC CARD TERMINAL

This application is a continuation of international application PCT/JP00/04579, filed on Jul. 7, 2000.

TECHNICAL FIELD

The present invention relates to an IC card terminal for accessing an IC card and executing IC card functions.

BACKGROUND ART

An IC card is a plastic card containing an embedded LSI chip with on-chip CPU and memory. Since an IC card can ensure higher security and store a greater volume of data than a conventional magnetic card, a single card can be used to implement a plurality of functions such as credit card or electronic money functions. A variety of IC card standards are well known such as MULTOS, JAVACARD, and Smart Card for Windows. Various types of IC card terminals have been provided for accessing and communicating with these kinds of IC cards.

FIG. 4 is a diagram showing a first example of the configuration of communication between an IC card and IC card terminal by using the conventional method. FIG. 4 shows the program structures of the IC card and IC card terminal, respectively, and the inter-program communication configuration. IC card 1 is equipped with card-side application programs (hereafter, referred to as card applications) $P_A$, $P_B$, and $P_C$, which correspond to a plurality of functions A, B, and C, respectively, and the card I/O. The card I/O (input/output) is a part of the IC card OS (operating system).

FIG. 4 is a communication configuration example in which IC card terminal 10 has only a terminal-side application program (hereafter, referred to as a terminal application) $R_A$, which corresponds to function A. Terminal application $R_A$ communicates with card application $P_A$ via provider $Q_A$ of terminal application $R_A$ and an IFD (interface device) driver for controlling communication with the IC card, as well as via the card I/O. Commands from terminal application $R_A$ are directed to the corresponding card application $P_A$ by the card I/O. In other words, in FIG. 4, terminal applications and card applications have one-to-one relationships, and the IFD driver receives commands only from one terminal application.

FIG. 5 is a diagram showing a second example of the configuration of communication between an IC card and IC card terminal by using the conventional method. Specifically, FIG. 5 is a communication configuration example in which IC card terminal 10 has one terminal application $R_{ABC}$, which corresponds to functions A, B, and C. In this case, although terminal application $R_{ABC}$ corresponds to a plurality of functions, it does not simultaneously access a plurality of card applications in parallel. For example, while terminal application $R_{ABC}$ is communicating with card application $P_A$, it does not communicate with other card applications $P_B$ and $P_C$. In other words, in FIG. 5, terminal applications and card applications have one-to-many relationships, but even in this case, the IFD driver receives commands only from one terminal application.

However, when terminal applications and card applications have one-to-many relationships as described above, to add card applications corresponding to new functions to an IC card or to change some functions, all of the terminal applications of an IC card terminal must be newly created and exchanged, which is extremely troublesome.

FIG. 6 is a diagram showing a third example of the configuration of communication between an IC card and IC card terminal by using the conventional method. Specifically, FIG. 6 is a communication configuration example in which IC card terminal 10 has a plurality of terminal applications $R_A$, $R_B$, and $R_C$, which correspond to functions A, B, and C, respectively. In other words, in FIG. 6, terminal applications and card applications have many-to-many relationships. With these kinds of relationships, to add or change card applications, only the terminal applications corresponding to those card applications need to be added or changed in the IC card terminal, so the IC card terminal can support the addition or change of IC card functions with flexibility.

However, many-to-many relationships may result in the following kinds of problems. Since each of the terminal applications are mutually independent, each terminal application sends commands to the IFD driver regardless of whether or not another terminal application is communicating. If the IFD driver receives a new command while communication is in progress, it disconnects the communication path where communication is in progress, and establishes a communication path corresponding to the new command.

For example, terminal application $R_B$ sends a command intended for card application $P_B$ to the IFD driver while terminal application $R_A$ is communicating with card application $P_A$. When this is done, the IFD driver disconnects the communication path to card application $P_A$ and establishes a communication path to card application $P_B$. In other words, the card I/O of the IC card directs the command from the IFD driver to card application $P_B$. Therefore, the command from terminal application $R_A$ ends up being sent to card application $P_B$, and an application error occurs. Also, the response from card application $P_A$ is not sent to terminal application $R_A$, and a communication error occurs.

DISCLOSURE OF THE INVENTION

An object of the present invention is to provide an IC card terminal that can execute communication processing for commands from a plurality of terminal applications, respectively, without causing an error to occur.

To accomplish the abovementioned object, a communication control function for prohibiting communication with card programs due to other terminal applications while a certain terminal application is communicating with its corresponding card program is assigned by the present invention to the IFD driver, which controls communication with an IC card, in an IC card terminal. This enables an IC card terminal to process commands from a plurality of terminal applications without causing an error to occur.

An IC card terminal of the present invention, which communicates with an IC card for storing a plurality of card programs corresponding to a plurality of functions, respectively, comprises a memory for storing a plurality of terminal programs corresponding to the above-mentioned plurality of functions, respectively, a processor for executing the abovementioned plurality of terminal programs, respectively, to communicate with each of the card programs corresponding to each of the terminal programs that are executed, and a communication controller for controlling communication with the above-mentioned plurality of card programs, wherein the above-mentioned communication controller prohibits communication with other card programs while communication with a first card program among the abovementioned plurality of card programs is in progress.

Specifically, when the abovementioned communication controller receives a command intended for a second card program while communication with the abovementioned first card program is in progress, it waits the transmission of the command to the abovementioned second card program. In addition, after communication with the above-mentioned first card program terminates, the above-mentioned communication controller sends the abovementioned command to the abovementioned second card program to enable communication with the abovementioned second card program.

BEST MODE FOR CARRYING OUT THE INVENTION

An embodiment of the present invention is described below according to the figures. However, the technical range of the present invention is not limited to the embodiment presented.

Figure 1:
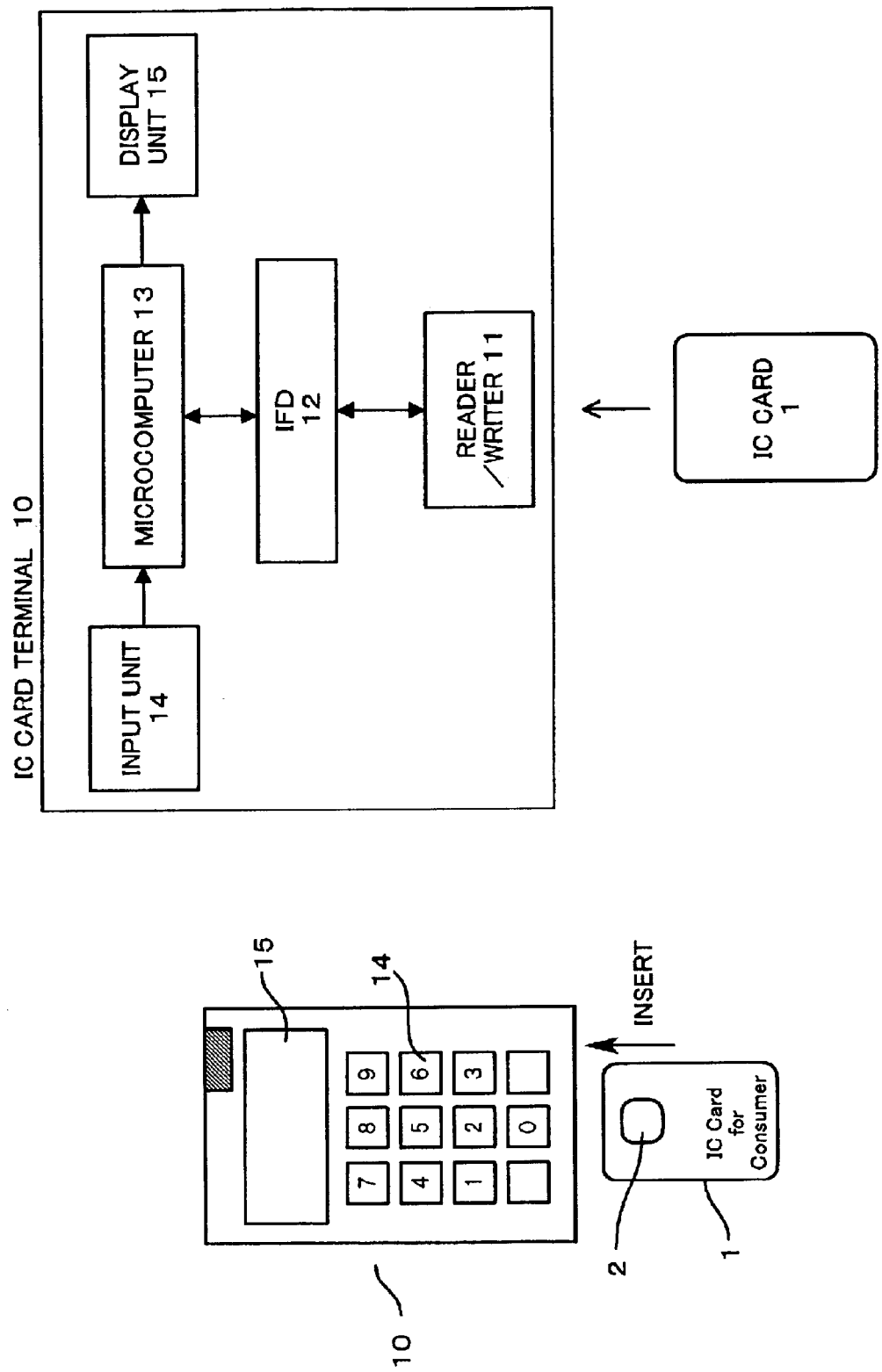
FIG. 1(a) is an example view of an IC card terminal in an embodiment of the present invention.
FIG. 1(b) is a schematic and block diagram of an IC card terminal in an embodiment of the present invention.

FIG. 1 is a schematic diagram of an IC card terminal in an embodiment of the present invention. FIG. 1(a) is an external view, and FIG. 1(b) is a block diagram. IC card 1 contains built-in LSI chip 2, which supports a plurality of functions such as credit card or electronic money functions. LSI chip 2 stores card applications corresponding to each of the functions. IC card terminal 10, which is a handy-type terminal as shown in FIG. 1(a), for example, comprises an input unit 14 for entering information such as an amount of money or password, a display unit 15 using liquid crystal or the like, and an IC card insertion slot, which is not illustrated. In addition, IC card terminal 10 has a built-in reader/writer 11 for reading data from and writing data to IC card 1, an IFD (interface device) 12 for controlling communication with IC card 1, and a microcomputer 13, as shown in FIG. 1(b). Microcomputer 13 comprises memory for storing terminal applications corresponding to each of the functions and providers of each of the terminal applications, and a processor (CPU) for executing these terminal applications to communicate with the card applications.

Figure 2:
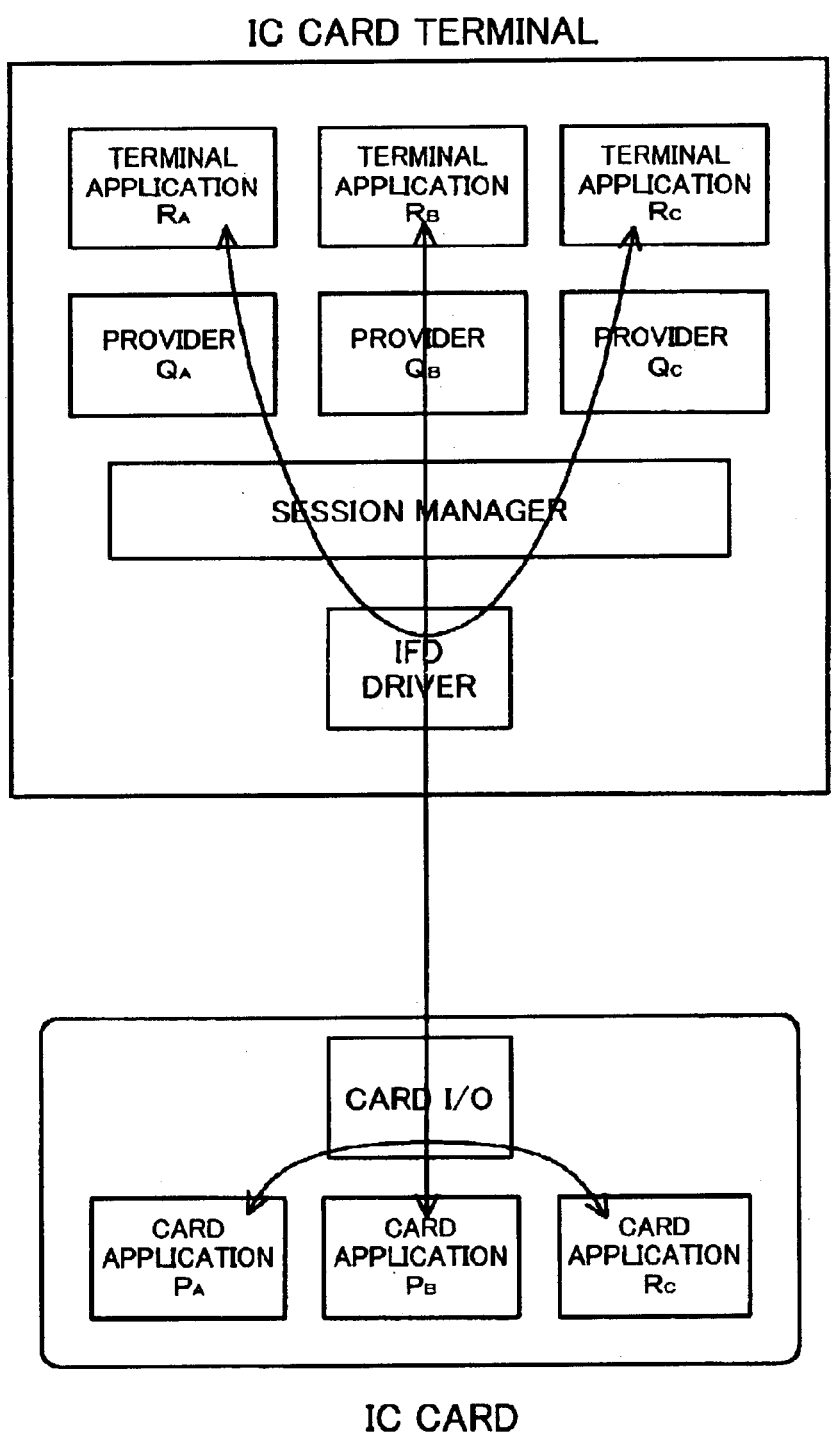
FIG. 2 is a conceptual diagram of an IC card terminal in an embodiment of the present invention.

FIG. 2 is a diagram showing the configuration of communication between an IC card and IC card terminal in an embodiment of the present invention. According to FIG. 2, a communication control function (session manager) for prohibiting communication with card programs due to other terminal applications while a certain terminal application is communicating with its corresponding card program is assigned to a program (IFD driver) that is built into IFD 12 of IC card terminal 10 of the present invention. In FIG. 2, the session manager is shown outside of the IFD driver for explanatory purposes.

Figure 3:
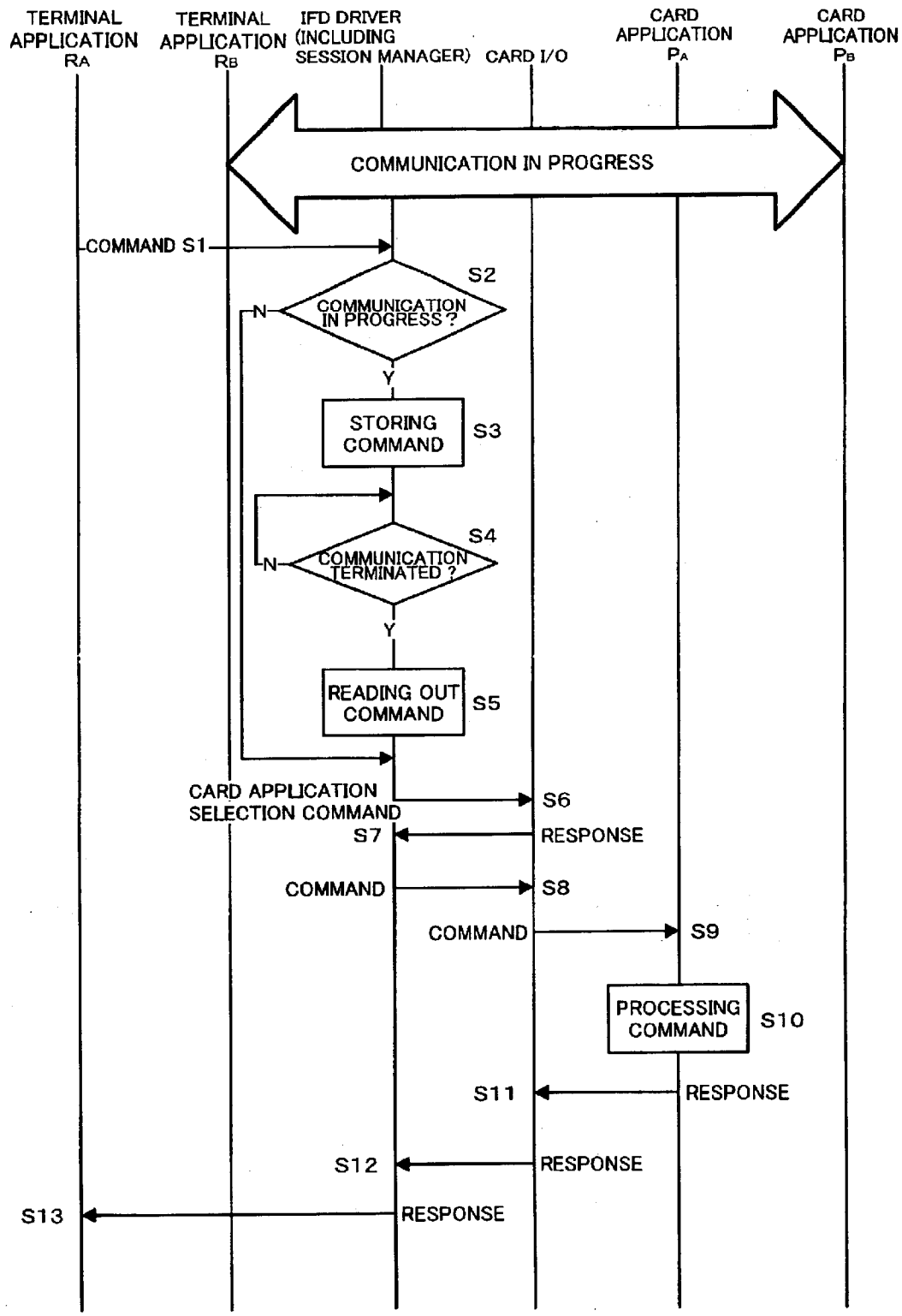
FIG. 3 is a flowchart of communication control processing in an embodiment of the present invention.
Figure 4:
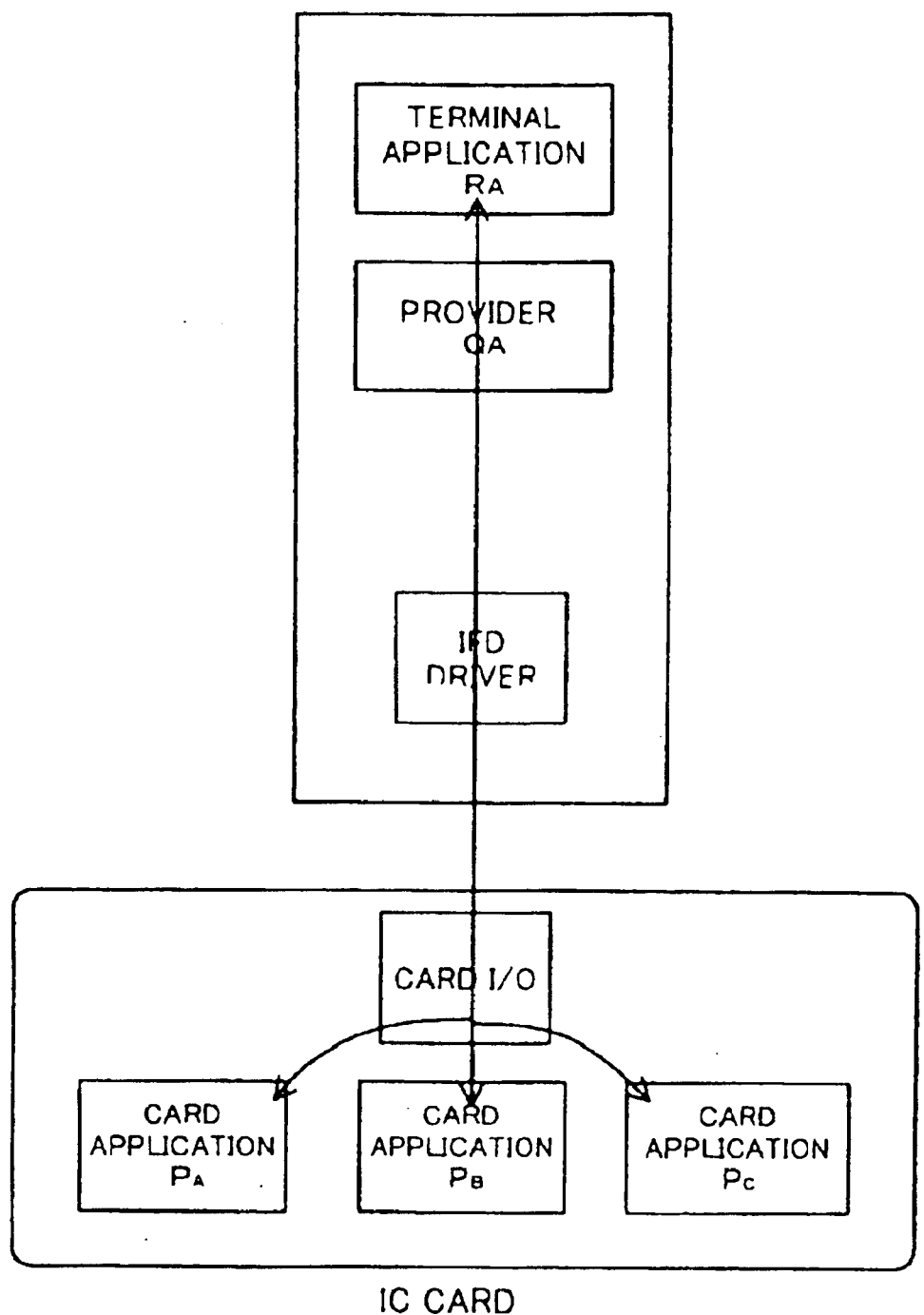
FIG. 4 is a diagram showing a first example of the configuration of communication between an IC card and IC card terminal by using the conventional method.
Figure 5:
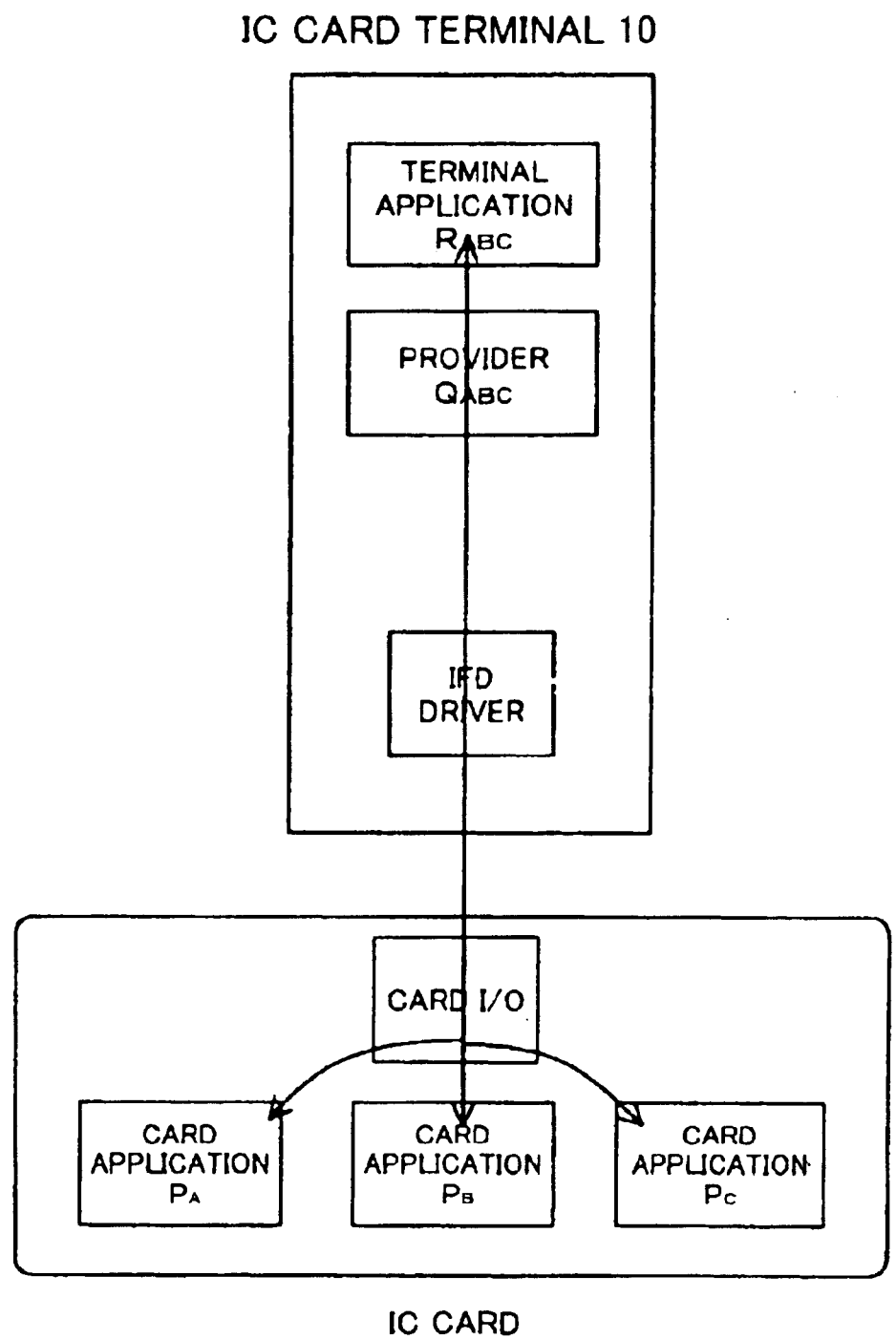
FIG. 5 is a diagram showing a second example of the configuration of communication between an IC card and IC card terminal by using the conventional method.
Figure 6:
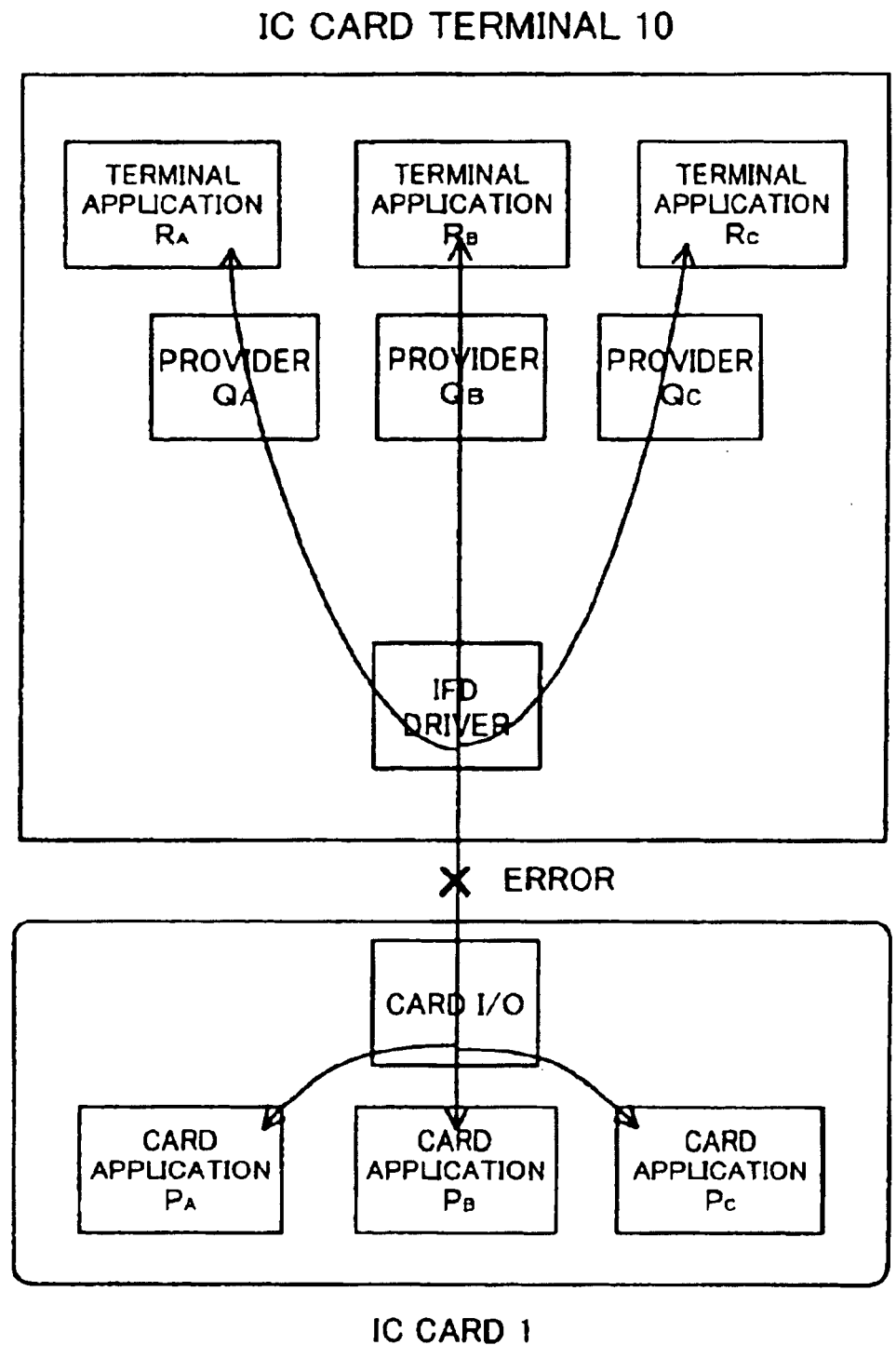
FIG. 6 is a diagram showing a third example of the configuration of communication between an IC card and IC card terminal by using the conventional method.

FIG. 3 is a communication control flowchart in an embodiment of the present invention. For example, terminal application $R_A$ first sends a command intended for card application $P_A$ to the IFD driver (S1). The IFD driver confirms whether or not communication for command processing is in progress (S2). For example, the IFD driver, which has a flag, sets the flag on when a command is read from the queue as explained below, and sets the flag off when a response from a card application is sent to a terminal application. In other words, while the flag is on, communication with a card application is in progress.

When communication is in progress in step S2, the IFD driver stores the command in the IFD driver queue (S3). When communication for a separate command terminates (S4), the IFD driver reads a command from the queue (S5).

Next, the IFD driver sends a card application selection command to the card I/O of the IC card (S6). In this case, the card application selection command requests the selection of card application $P_A$. When the card I/O receives the abovementioned card application selection command, it selects the communication path to card application $P_A$ and returns a response to the IFD driver (S7).

When the command that was read in step S5 is a command intended for the same card application as the command that was processed according to the preceding communication, the IFD driver need not send a card application selection command. For example, if the command that was processed according to the preceding communication was also a command intended for card application $P_A$ from terminal application $R_A$, since the card I/O has already selected the communication path to card application $P_A$, the command is sent to card application $P_A$ without again sending a card application selection command for selecting the communication path to card application $P_A$.

When the IFD driver receives the response to the card application selection command, it sends the command that was read from the abovementioned queue to the card I/O (S8). The card I/O forwards the command to card application $P_A$ (S9). Card application PA executes the processing for the received command (S10) and sends the response for that processing result to the card I/O (S11). The card I/O sends that response to the IFD driver (S12), and then the IFD driver forwards that response to terminal application $R_A$ (S13). When the IFD driver forwards the response from card application $P_A$ to terminal application $R_A$, it checks the queue again and if commands are stored, it sequentially reads them and repeats the above-mentioned processing.

In this way, according to an embodiment of the present invention, a queue is established in the IFD driver, and a command from a terminal application is temporarily stored when communication for a separate command is in progress. Then, after communication for the separate command terminates, that command is read from the queue, and communication for that command is started. In other words, by queuing communication for a separate command until communication for one command terminates, commands from a plurality of terminal applications can be processed without generating an error in which a command from a terminal application is not sent to its corresponding card application or an error in which a response from a card application is not sent to the IC card terminal.

The IC card functions in an embodiment of the present invention are not limited to credit card functions or electronic money functions. For example, they may include point service functions corresponding to the purchase amount for purchases using IC cards, customer management functions for managing purchase history and other information, or debit card functions.

Also, the IC card terminal is not limited to a handy-type terminal, but may be a desktop-type terminal or a personal computer that can read IC cards.

INUSTRIAL APPLICABILITY

As explained above, a communication control function for prohibiting communication with card programs due to other terminal applications while a certain terminal application is communicating with its corresponding card program is assigned according to the present invention to the IFD driver, which controls communication with an IC card, in an IC card terminal. This enables an IC card terminal to process commands from a plurality of terminal applications without causing an error to occur.

The range of protection of the present invention extends to the inventions that appear in the claims and equivalent inventions, and is not limited to the abovementioned embodiment.

What is claimed is:

1. An IC card terminal, comprising:

a processor executing a plurality of terminal programs to communicate with a respective plurality of card programs, said card programs being stored in an IC card, said plurality of terminal programs including at least first and second terminal programs, said plurality of card programs including at least first and second card programs; and a communication controller controlling communication with said plurality of card programs, said communication controller waiting to transmit a command to said second card program when said communication controller receives said command intended for said second card program while communication with said first card program is in progress, said communication controller sending said command to said second card program to enable communication with said second card program when communication with said first card program terminates.

2. An IC card terminal, which communicates with an IC card for storing a plurality of card programs corresponding to a plurality of functions, respectively, comprising:

a memory for storing a plurality of terminal programs corresponding to said plurality of functions, respectively;

a processor for executing said plurality of terminal programs, respectively, to communicate with each of the card programs corresponding to each of the terminal programs that are executed; and a communication controller for controlling communication with said plurality of card programs, wherein said communication controller prohibits communication with other card programs while communication with a first card program among said plurality of card programs is in progress, wherein, when said communication controller receives a command intended for a second card program while communication with said first card program is in progress, the communication controller waits to transmit said command to said second card program, and wherein, after communication with said first card program terminates, said communication controller sends said command to said second card program to enable communication with said second card program.

\* \* \* \* \*